W. GLAESER.
METHOD OF TREATING POTASH BEARING SILICATES.
APPLICATION FILED FEB. 9, 1916.
1,379,914.
Patented May 31, 1921.
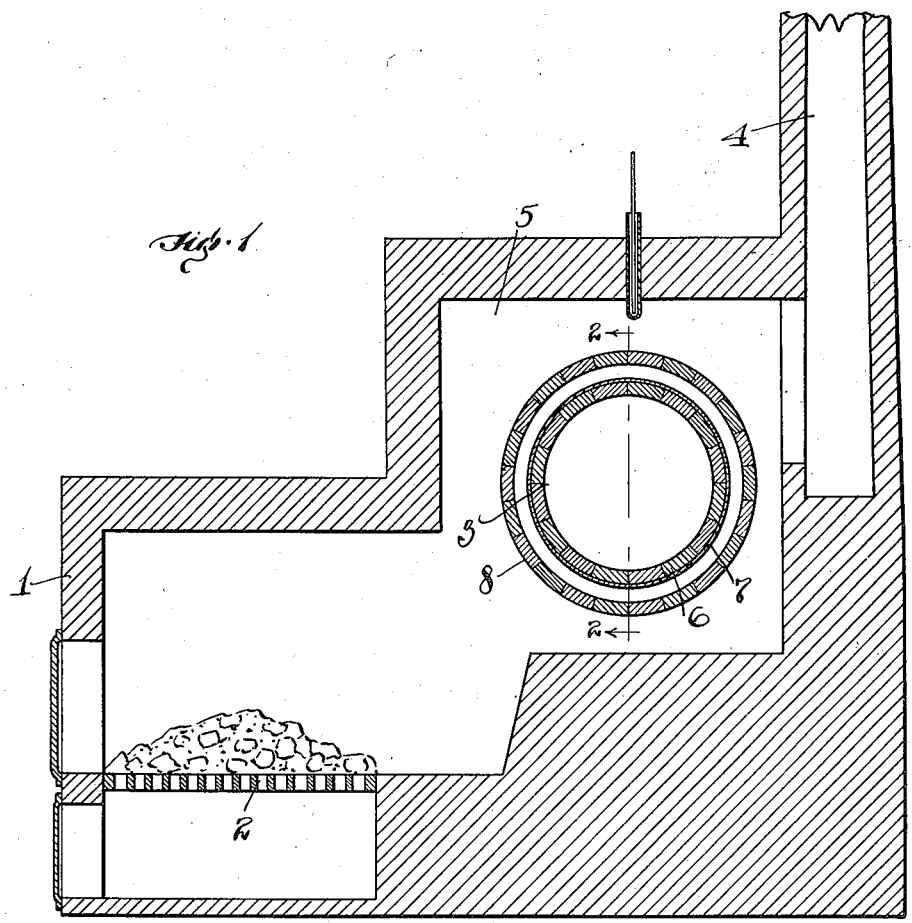
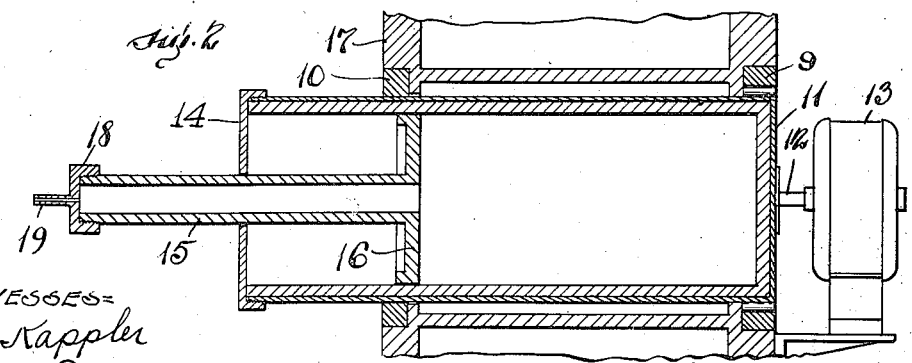
WITNESSES:
O. M. Kappler
Thos. H. Fay
INVENTOR
Walter Glaeser
BY Fay, Oberlin & Fay, ATTYS.

UNITED STATES PATENT OFFICE.

WALTER GLAESER, OF BROOKLYN, NEW YORK, ASSIGNOR, BY MESNE ASSIGNMENTS, TO POTASH EXTRACTION CORPORATION, OF NEW YORK, N. Y., A CORPORATION OF NEW YORK.

METHOD OF TREATING POTASH-BEARING SILICATES.

1,379,914. Specification of Letters Patent. Patented May 31, 1921.

Application filed February 9, 1916. Serial No. 77,319.

*To all whom it may concern:*

Be it known that I, WALTER GLAESER, a subject of the German Emperor, and a resident of Brooklyn, county of Kings, and State of New York, have invented a new and useful Improvement in Methods of Treating Potash-Bearing Silicates, (Case 7,) of which the following is a specification, the principle of the invention being herein explained and the best mode in which I have contemplated applying that principle, so as to distinguish it from other inventions.

The present improvements relate to a method of treating feldspar for the purpose of rendering the potash content of the same available for use in agriculture as a fertilizer. It is well known that feldspar is abundant in this country, but the potash content of the feldspar which is very valuable for agricultural purposes, is not in such form that the feldspar can be used as a fertilizer, the potash content being almost completely insoluble in water. The present invention has for its object the treatment of the feldspar in a simple and inexpensive manner to render this potash content water soluble, and to thus render available for agricultural purposes the vast deposits of feldspar which are to be found practically all over the eastern part of the United States as well as in many other places. To the accomplishment of the foregoing and related ends, said invention, then, consists of the means and method hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

In said annexed drawings:—

Figure 1 is a central vertical section through one form of apparatus which can be utilized in carrying out my improved method; and Fig. 2 is a central vertical section taken at right angles to the plane of Fig. 1 through the container for the material.

The method can best be described with reference to the apparatus shown in the drawings, although it will be understood that other forms of apparatus may be employed if desired, the present construction being but one of a number of forms and being adapted primarily for treating small amounts of the material. In Fig. 1 there is shown a furnace chamber 1 having the grate 2 in an extension at one side and permitting the products of combustion to pass laterally from this extension around a cylinder 3 adapted to contain the material, after which the heated gases pass through a stack 4. The chamber 5 in which is received the container 3, is of substantially rectangular form, and is constructed to give an equal distribution of the gases on all sides of the container.

The container comprises an iron or steel casing 7 lined internally with suitable refractory materials such as fire brick 6 and rotatably mounted concentrically within a suitable protective casing 8, also of refractory material. In this way the gases are prevented from coming in direct contact with the container and no products of combustion pass over, or come in contact with, the material received within the container, although the temperature of this container is substantially the same as, or higher than, that in the chamber 5.

The casing 7 is rotatably mounted, as stated, being held in the walls of the furnace at one end in a roller bearing 9 and at the other end in a plain bearing 10, which of course are sufficiently loose to permit of the expansion of the iron shell 7 under the high temperature which is to be maintained in the furnace. Attached to a fixed end wall 11 of the casing is a shaft 12 driven by a motor 13 so that the casing may be rotated. At its other end the casing is closed by means of a removable cap 14 apertured at its center to permit of the passage therethrough of a conduit 15 which is attached to a movable end or piston 16 fitting snugly within the casing and normally maintained in alinement with the wall 17 of the furnace, so that the effective length of the cylinder is the same as the length of the furnace. The end of the conduit 15 is partially closed by a cap 18, provided, however, with an open nozzle 19, which permits of the escape of the gases evolved during the heating.

The feldspar is first prepared by being crushed to a convenient size and heated to between 800 and 900° C. in an open kiln. After this heating has continued for several hours, the material is removed and suddenly chilled, and is thus rendered amorphous and easily broken up, and is then ground to preferably the fineness of an 80 mesh screen. This preliminary treatment of the feldspar is not new and has been before employed by those attempting to treat feldspar for the purpose of rendering the potash content water soluble.

The powdered amorphous feldspar is then mixed with calcium chlorid preferably in equal parts, and to this mixture about 5 per cent. of iron, or an oxid of iron, or of iron-containing coke, or of mixture of coke and iron is added. The resultant mixture is then charged into the container 6, the movable end on the piston 16 is moved into alinement with the end wall 16 of the furnace and the casing is then rotated while the temperature is raised to about 1000° C. and maintained for several hours. During this heating action a certain amount of gas is evolved and this gas is permitted to escape from the open nozzle 19 of the conduit 15. No products of combustion are admitted to the container since a reducing or non-oxidizing atmosphere must be maintained therein. Calcium chlorid, while the most desirable material for this purpose from some standpoints, is not the only substance suitable as I have employed sodium chlorid in this step of the process with very good results.

The action that takes place in the material during this heating is indicated by the following reaction equations which show that the iron or iron-containing coke or the mixture of both depending upon which is used, acts as a transfer agent to transform the calcium chlorid into ferric chlorid and calcium oxid after which the ferric chlorid attacks the feldspar producing ferric oxid, calcium aluminum silicate and potassium chlorid.

The reaction that takes place when calcium chlorid, and iron oxid are used is represented by the equations:

$$3CaCl_2 + Fe_2O_3 = 3CaO + Fe_2Cl_6$$

$$3(K_2O.Al_2O_3.6SiO_2) + 3CaO + Fe_2Cl_6 = 6KCl + 3(CaO.Al_2O_3.6SiO_2) + Fe_2O_3.$$

When magnetic iron oxid is used the reaction is represented:—

$$4CaCl_2 + Fe_3O_4 = 4CaO + Fe_2Cl_6 + FeCl_2.$$

$$4(K_2O.Al_2O_3.6SiO_2) + 4CaO + Fe_2Cl_6 + FeCl_2 = 8KCl + Fe_3O_4 + 4(CaO.Al_2O_3.6SiO_2)$$

If metallic iron is used the reaction is as follows:

$$CaCl_2 + Fe + O = CaO + FeCl_2$$

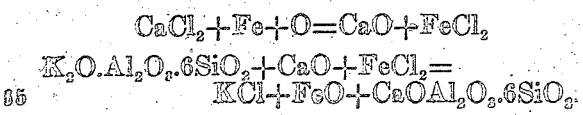

If coke containing iron is used, the reaction may be represented:

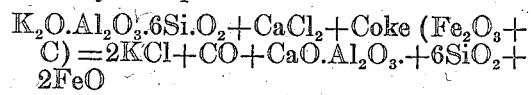

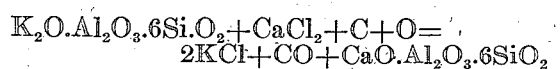

From the foregoing equations the reactions that take place when sodium chlorid is used with feldspar and iron containing coke, iron or iron oxid will be readily understood as they are similar to the ones given above. This reaction continues until the ferric oxid (or transfer agent) which is always regained, has reacted upon all of the calcium chlorid to produce enough ferric chlorid to react with the total potash content of the feldspar. Ferric oxid if used acts not as a reducing contact substance, but as a catalytic agent and may be employed without a reducing agent in the absence of air leakage, that is, when the atmosphere in the container is already non-oxidizing in character. The presence of a reducing agent in only necessary to preserve a non-oxidizing condition, and where this condition is already present, or is secured in some other way, the reducing agent is of course not essential. After several hours heating, which is sufficient to cause the reaction to go to completion, the temperature is permitted to drop and the cap 14 from the casing 6 is then removed, permitting the conduit 15 and the end 16 to be also removed when an operator can rake the material in the container into that portion of the latter which is outside of the furnace and it is therefore comparatively cool. After the material has been thus moved to a cool part of the container the cap 14 and end 16 are replaced as the material must not cool in contact with the atmosphere or the resultant materials can react and potash in a water soluble condition is not secured as a part of the product.

The mixture then contains potassium chlorid, calcium aluminum silicate, and ferric oxid, and if desired this entire mixture can be used as a fertilizer, although preferably the potassium chlorid will be separated from the mass and used alone, but of course this process of separation forms no part of the present invention and various methods may be employed for isolating the potassium chlorid. By this improved process it is possible to secure in water soluble form between 90 and 100% of the potash in the feldspar, and the process is not an expensive one, since no expensive reagents are required, and the length of time necessary to complete the reaction is not over two hours, and is generally about an hour and a half.

The present process is carried out in a closed chamber, that is, out of contact with oxygen, or it may be carried out in a non-oxidizing atmosphere.

In the absence of oxygen no reducing agents are necessary.

The process is carried out under exclusion of oxygen in order to insure an atmosphere free from oxygen, (meaning of course the oxygen which leaks into the apparatus) or an atmosphere in which the oxygen is rendered harmless, (again referring to the oxygen which leaks into the apparatus) in other words, a non-oxidizing atmosphere, by a reducing agent added to the calcium chlorid feldspar mixture or water soluble metallic chlorid-feldspar mixture. Without the presence of a non-oxidizing atmosphere the extraction of the potash would be materially lowered because of the reformation of insoluble potash-aluminum respectively potash-aluminum-calcium silicate. The following type equations serve to illustrate this point:

Oxidizing atmosphere:

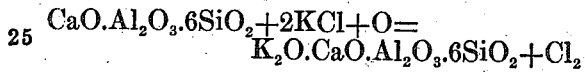

Non-oxidizing (reducing) atmosphere:

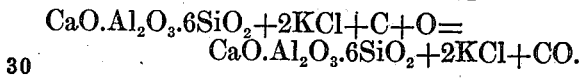

Magnetic iron oxid or metallic iron, used as reducing agents, also act as contact substances as shown by the above equations of the application. The use of a contact agent alone, like iron oxid (ferric oxid) is essential only in so far as it permits the temperature to be maintained at a lower point than would otherwise be possible, at the same time causing the reaction to proceed more quickly. With a contact substance acting materially as in the manner shown above the temperature need not greatly exceed 900° centigrade, but without it the temperature is maintained at very close to 1000° centigrade.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:—

1. In a method of treating potash-bearing silicates, the steps which consist in mixing calcium chlorid and a chlorin-conveying contact substance with a powdered amorphous silicate, and then heating such mixture out of contact with the atmosphere to above 800° C.

2. In a method of treating potash-bearing silicates, the steps which consist in mixing calcium chlorid and a chlorin-conveying contact substance with a powdered amorphous silicate, and then heating such mixture in a non-oxidizing atmosphere at a temperature above 900 degrees C.

3. In a method of treating feldspar, the steps which consist in mixing powdered amorphous feldspar with a water soluble salt and a reducing contact substance, and then heating the mixture at a temperature above 900° C.

4. In a method of treating feldspar, the steps which consist in mixing calcium chlorid and a reducing contact substance with powdered amorphous feldspar, and then heating such mixture out of contact with the atmosphere at a temperature above 900° C.

5. In a method of treating feldspar, the steps which consist in mixing calcium chlorid and a reducing contact substance with powdered amorphous feldspar, and then heating such mixture in a non-oxidizing atmosphere at a temperature above 900° C.

6. In a method of treating feldspar, the steps which consist in mixing calcium chlorid and a reducing contact substance with powdered amorphous feldspar, and then heating such mixture in a non-oxidizing atmosphere at about 1000° centigrade.

7. In a method of treating feldspar, the steps which consist in mixing approximately equal amounts of powdered amorphous feldspar and calcium chlorid, together with a small amount of a reducing contact substance, and then heating such mixture out of contact with the atmosphere at a temperature above 900° C.

8. In a method of treating feldspar, the steps which consist in mixing approximately equal amounts of powdered amorphous feldspar and calcium chlorid, together with about five per cent. of a reducing contact substance, and then heating such mixture out of contact with the atmosphere at a temperature above 900° C.

9. In a method of treating feldspar, the steps which consist in mixing approximately equal amounts of powdered amorphous feldspar and calcium chlorid, together with a small amount of an oxid of iron as a reducing agent, and then heating such mixture out of contact with the atmosphere at a temperature above 900° C.

10. In a method of treating feldspar, the steps which consist in mixing approximately equal amounts of powdered amorphous feldspar and calcium chlorid, together with a small amount of an oxid of iron as a reducing agent, and then heating such mixture out of contact with the atmosphere at about 1000° centigrade.

11. In a method of treating feldspar, the steps which consist in mixing powdered amorphous feldspar with a water soluble metal chlorid and a reducing contact substance, heating such mixture out of contact with the atmosphere at a temperature above 900° C. and then cooling such mixture also out of contact with the atmosphere.

12. In a method of treating feldspar, the steps which consist in mixing approximately equal amounts of powdered amorphous feldspar and calcium chlorid, together with a small amount of an oxid of iron as a reducing agent, heating such mixture in a nonoxidizing atmosphere at a temperature above 900 degrees centigrade and then cooling such mixture also out of contact with the atmosphere.

Signed by me, this 4th day of February, 1916.

WALTER GLAESER.

Attested by:—
A. T. GHEGAN,
H. A. SMITH.